(12) United States Patent
Carroll et al.

(10) Patent No.: US 7,156,590 B2
(45) Date of Patent: Jan. 2, 2007

(54) QUILL LOCK ASSEMBLY

(75) Inventors: Craig A. Carroll, Milan, TN (US);
Jeffrey D. Weston, Jackson, TN (US)

(73) Assignee: Black & Decker Inc., Newark, DE (US)

( * ) Notice: Subject to any disclaimer, the term of this patent is extended or adjusted under 35 U.S.C. 154(b) by 236 days.

(21) Appl. No.: 10/976,020

(22) Filed: Oct. 28, 2004

(65) Prior Publication Data
US 2006/0104733 A1 May 18, 2006

Related U.S. Application Data

(60) Provisional application No. 60/516,142, filed on Oct. 31, 2003.

(51) Int. Cl.
*B23Q 1/28* (2006.01)

(52) U.S. Cl. .......................... 409/231; 408/4; 408/135; 408/136; 188/67; 188/69

(58) Field of Classification Search ............... 188/1.12, 188/31, 67, 69; 408/4, 128, 129, 135, 136, 408/234; 409/231, 232, 233, 235; *B23Q 1/28*, *B23Q 5/20*
See application file for complete search history.

(56) References Cited

U.S. PATENT DOCUMENTS

| | | | | |
|---|---|---|---|---|
| 2,072,646 A | * | 3/1937 | Ocenasek | 408/128 |
| 2,154,745 A | * | 4/1939 | Hedgpeth | 408/128 |
| 2,447,424 A | * | 8/1948 | Nightingale | 74/842 |
| 2,491,940 A | * | 12/1949 | Tree | 409/218 |
| 2,621,686 A | * | 12/1952 | Tompkins | 144/103 |
| 2,909,082 A | * | 10/1959 | Booth | 173/2 |
| 3,124,015 A | * | 3/1964 | Mottu | 408/235 |
| 3,251,250 A | * | 5/1966 | Mitchell | 408/135 |
| 3,455,207 A | * | 7/1969 | Meinke | 409/239 |
| 3,609,055 A | * | 9/1971 | Luff et al. | 408/135 |
| 3,718,405 A | * | 2/1973 | Keiter et al. | 408/128 |
| 3,884,592 A | * | 5/1975 | Shulters | 408/14 |
| 4,215,961 A | * | 8/1980 | Babel | 409/231 |
| 4,809,995 A | * | 3/1989 | Ramunas | 279/77 |
| 5,470,181 A | * | 11/1995 | Garcia | 409/134 |

FOREIGN PATENT DOCUMENTS

| | | | |
|---|---|---|---|
| DE | 2644178 | * | 4/1978 |
| RU | 207650 | * | 11/1968 |

* cited by examiner

*Primary Examiner*—Daniel W. Howell
(74) *Attorney, Agent, or Firm*—Mehul R. Jani; Adan Ayala; Charles E. Yocum

(57) ABSTRACT

A quill lock assembly for locking a quill of a device such as a drill press is described. The quill lock assembly includes a cam assembly and a handle connected to the cam assembly. The cam assembly is connected to the device, such as with a mounting bracket or the like, and is capable of rotating for alternately engaging and disengaging the quill. The cam assembly is self releasing, allowing a user to translate the quill toward a work piece and release the cam assembly from engagement with the quill in one motion.

33 Claims, 4 Drawing Sheets

QUILL LOCK ASSEMBLY

CROSS REFERENCE TO RELATED APPLICATIONS

The present application claims priority under 35 U.S.C. § 119(e) to the U.S. Provisional Application Ser. No. 60/516,142, filed on Oct. 31, 2003, which is herein incorporated by reference in its entirety.

FIELD OF THE INVENTION

The present invention generally relates to the field of locking devices, and more particularly to a quill lock assembly for locking a quill of a device, such as a drill press or the like.

BACKGROUND OF THE INVENTION

Devices which include a quill, such as drill presses or the like, typically include a mechanism for locking the quill, preventing translational movement thereof, such as movement toward or away from a work piece supported on a table. Typically, such a mechanism may include a screw, such as a set screw or the like, threaded into a housing surrounding the quill. The screw may be connected to a handle for providing mechanical advantage in tightening the screw.

Tightening the screw against the quill may allow the quill to be locked in place relative to the housing, but the use of such a mechanism also requires that the screw be loosened in order to release the quill. Because the quill is typically biased to move away from the table, it may not be possible to easily loosen the screw while grasping a pinion handle or the like for translating the quill (and typically a cutting bit attached thereto) toward a work piece, all in a smooth, one handed operation.

SUMMARY OF THE INVENTION

The present invention is directed to a quill lock assembly for locking a quill of a device, such as a drill press or the like. The quill lock assembly includes a cam assembly and a handle connected to the cam assembly. The cam assembly is connected to the device, such as with a mounting bracket or the like, and is capable of rotating for alternately engaging and disengaging the quill. In exemplary embodiments of the present invention, the cam assembly is self releasing, allowing a user to translate the quill toward a work piece and release the cam assembly from engagement with the quill in one motion.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
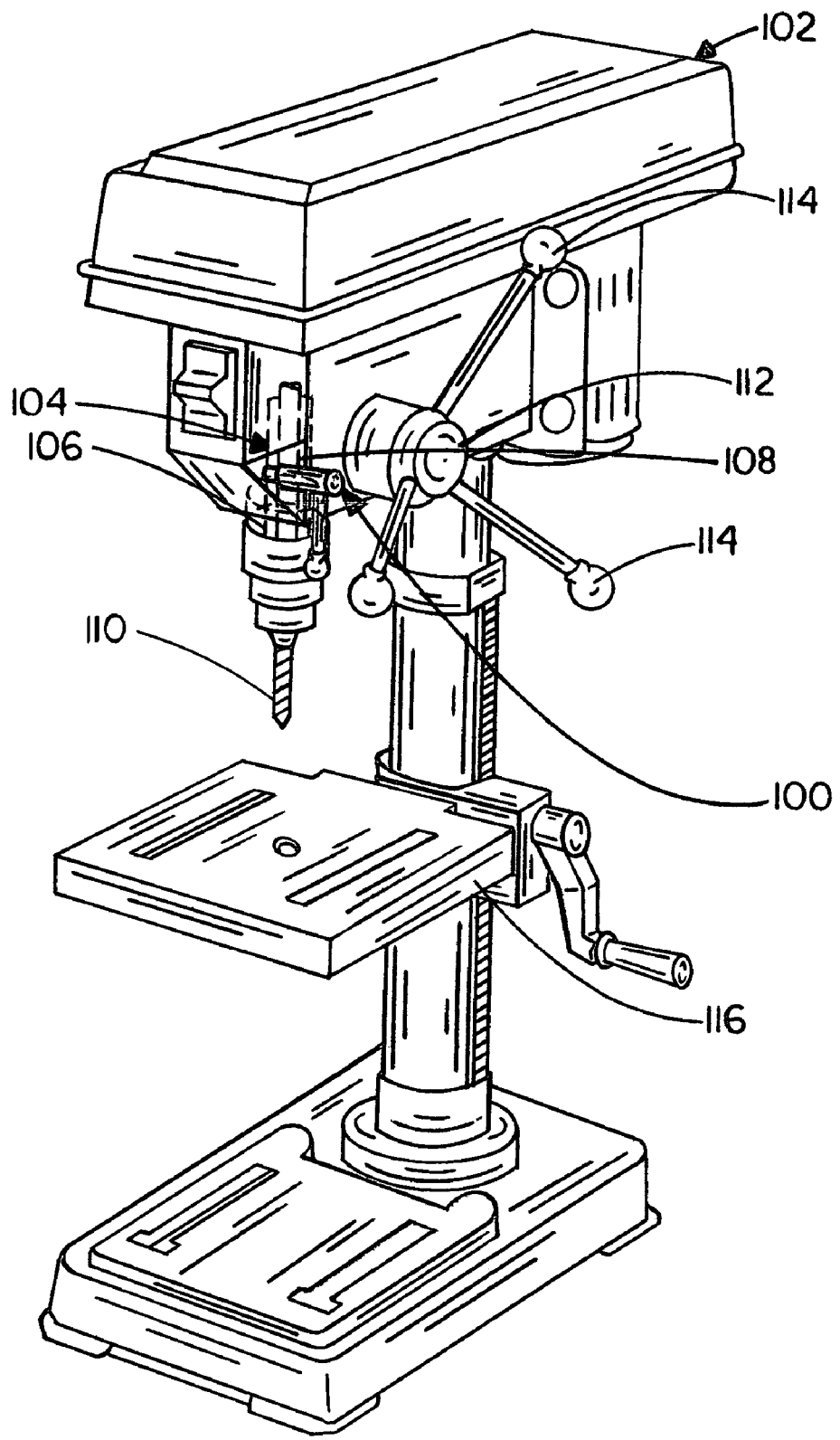
FIG. 1 is an isometric view illustrating a drill press including a quill lock assembly in accordance with an exemplary embodiment of the present invention.

Reference will now be made in detail to the presently preferred embodiments of the invention, examples of which are illustrated in the accompanying drawings.

Referring generally to FIGS. 1 through 4, a quill lock assembly 100 in accordance with exemplary embodiments of the present invention is described. The quill lock assembly 100 is for use with a device having a quill assembly, such as a drill press 102 or the like. An exemplary quill assembly 104 of the drill press 102 includes a quill 106 concentrically surrounding a spindle 108 for driving a cutting bit 110 or the like. While translationally fixed with respect to the quill 106, the spindle 108 is capable of axial rotation for driving the cutting bit 110. Thus, translational movement of the quill 106 will produce corresponding movement of the rotating cutting bit 110, while the cutting bit 110 rotates to shape a work piece or the like.

The quill 106 is connected to a pinion shaft 112 including a pinion shaft handle 114. The pinion shaft handle 114 may be grasped by a user and pulled to rotate the pinion shaft 112, causing the quill 106 and the cutting bit 110 to translate toward a table 116, upon which a work piece may be supported for being shaped by the cutting bit 110. Typically, the quill 106 is biased for translational movement away from the table 116, and the user overcomes this biasing force with the pinion shaft handle 114. In this manner, the quill assembly 104 will bias the cutting bit 110 away from a work piece if force is withdrawn from the pinion shaft handle 114.

Figure 2:
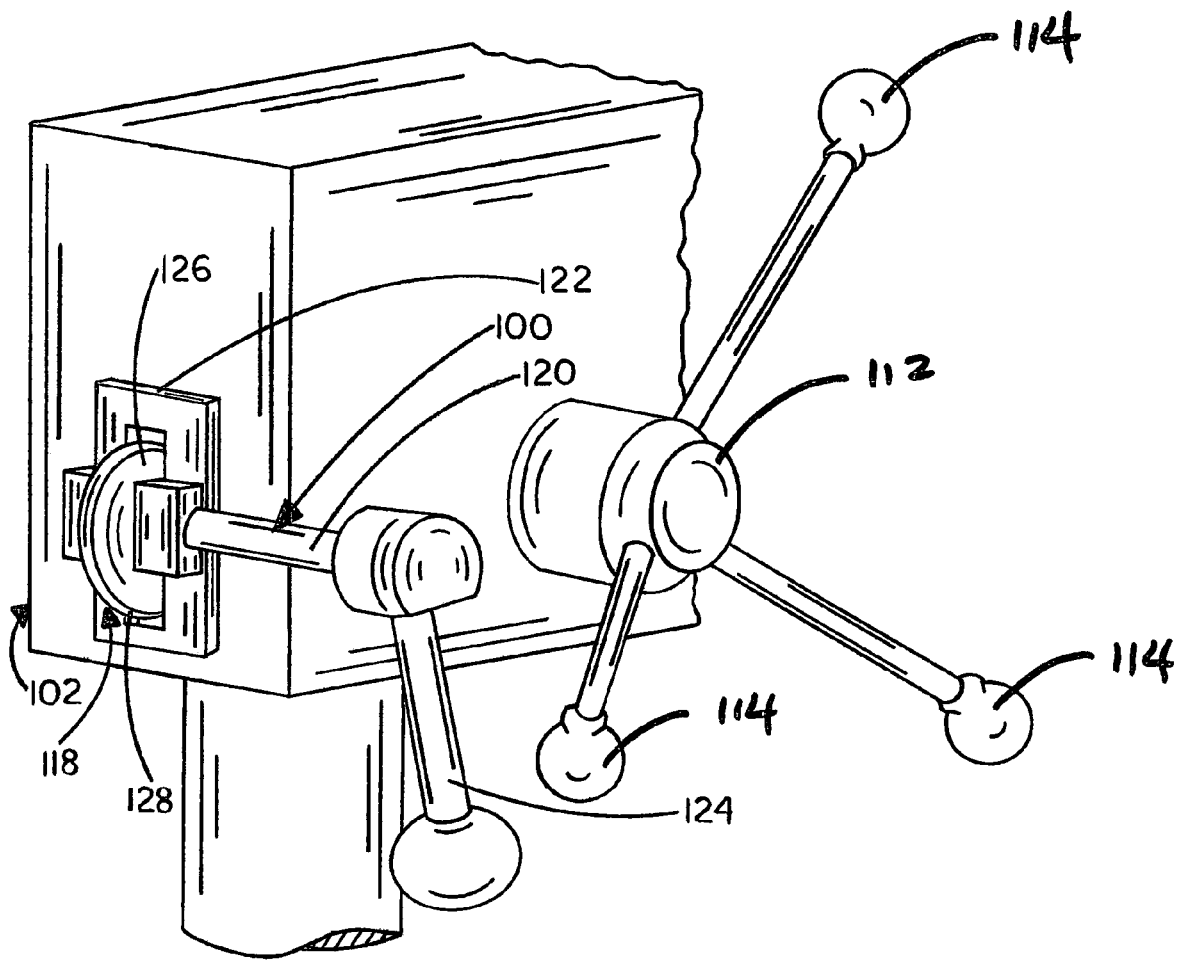
FIG. 2 is an isometric view of the quill lock assembly illustrated in FIG. 1, wherein a cover assembly has been removed.
Figure 3B:
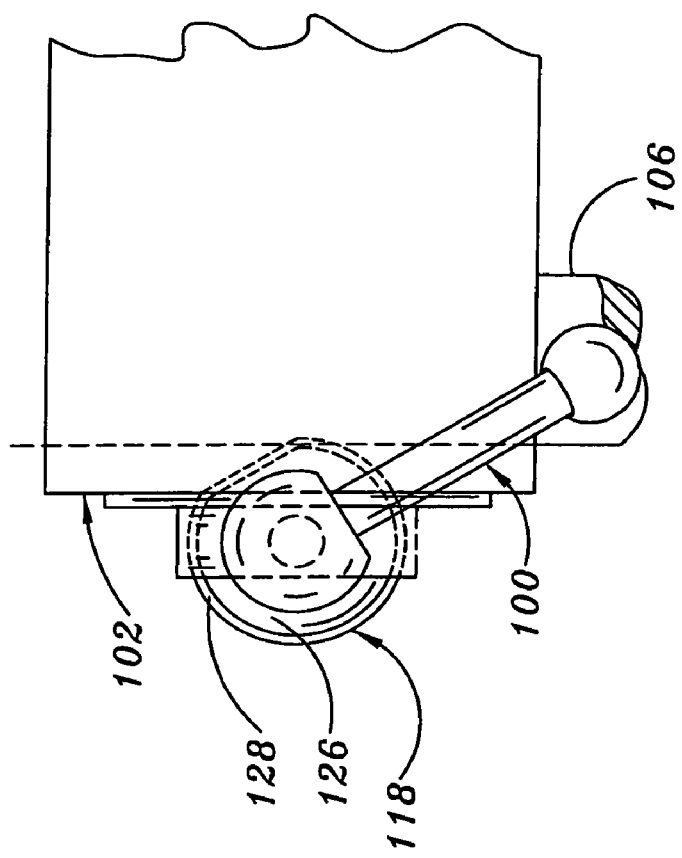
FIG. 3B is a side view of the quill lock assembly illustrated in FIG. 2, wherein the handle is in an engaged position.
Figure 3A:
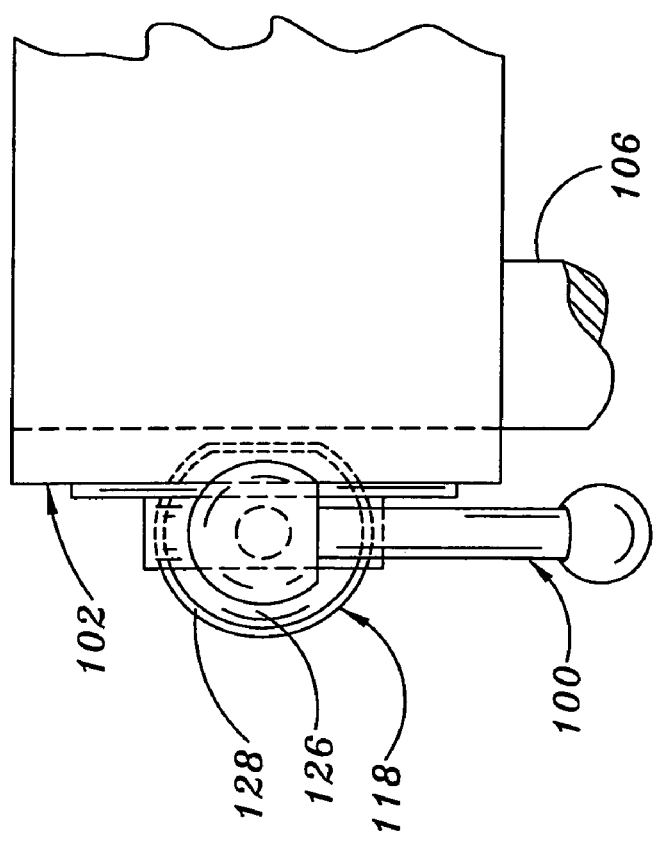
FIG. 3A is a side view of the quill lock assembly illustrated in FIG. 2, wherein a handle is in a disengaged position.

Referring now to FIGS. 2 through 3B, the quill lock assembly 100 is described. The quill lock assembly 100 may be used with a device having a quill assembly, such as the drill press 102 or the like. In exemplary embodiments of the present invention, the quill lock assembly 100 includes a cam assembly 118 fixedly connected to a shaft 120. The shaft 120 is rotationally connected to a mounting bracket 122 and includes a handle 124. By pushing the handle 124, the shaft 120 and the cam assembly 118 are rotated with respect to the mounting bracket 122, as illustrated in FIGS. 3A and 3B. As the cam assembly 118 rotates with respect to the mounting bracket 122, an edge of the cam assembly 118 contacts the quill 106, locking the quill 106 in place through a frictional interface, as shown in FIG. 3B.

In exemplary embodiments of the present invention, the handle 124 is threaded into a tapped hole in the shaft 120 and includes a knob or the like for being easily grasped by a user; however, those of ordinary skill in the art will appreciate that the handle 124 may be attached to the shaft 120 in many different ways without departing from the scope and intent of the present invention. For instance, the handle 124 may be formed from a plastic material and attached to the shaft 120 with a screw or the like. Alternately, the handle 124 and the shaft 120 may be formed as an integrated assembly or a single part for ease of manufacturing, assembly, or the like.

Further exemplary embodiments of the present invention include a handle 124 connected directly to the cam assembly 118. For example, the handle 124 may be threaded into a tapped hole in the cam assembly 118. In another instance, the cam assembly 118 and the handle 124 may be formed as a single part or an integrated assembly for ease of manufacturing, assembly, or the like.

The cam assembly 118 includes a cam 126. Preferably, the cam 126 is an eccentric, curved wheel, having a shape such as a varying diameter or the like for alternately engaging and disengaging the quill 106 when the cam assembly 118 is rotated by the shaft 120. In exemplary embodiments of the present invention, the cam 126 includes a material such as a strip 128 made from an elastomeric polymer, such as synthetic rubber or the like. The strip 128 is affixed to the edge of the cam 126 for increasing the frictional force between the cam assembly 118 and the quill 106, preventing surface marring of the quill 106, or the like. The strip 128 may be molded to the cam 126, co-molded with the cam 126, applied to the cam 126 as a coating, or the like.

Those of ordinary skill in the art will appreciate that alternative embodiments of the cam assembly 118 may include a cam 126 of constant diameter, having a material such as the strip 128 affixed to the edge of the cam 126 with a varying thickness or the like for alternately engaging and disengaging the quill 106 when the cam assembly 118 is rotated by the shaft 120. It is further contemplated that many various materials may be applied to the cam assembly 118 for increasing the frictional force between the cam assembly 118 and the quill 106, preventing surface marring of the quill 106, or the like without departing from the scope and spirit of the present invention.

While the exemplary embodiments shown and described include the strip 128, those of ordinary skill in the art will appreciate that the cam assembly 118 may be formed without such a strip without departing from the scope and intent of the present invention. It should also be noted that a surface finish for increasing frictional contact may be applied to the quill 106, to the edge of the cam assembly 118, to the cam 126, or the like. Alternately, the cam 126 may be formed from a material for increasing frictional contact between the cam assembly 118 and the quill 106, preventing surface marring of the quill 106, or the like. For example, the cam assembly 118 may be constructed from a plastic material or the like for preventing surface marring of the quill 106.

As previously described, when the handle 124 is pushed to rotate the shaft 120 and the cam assembly 118, the edge of the cam assembly 118 engages the quill 106. Those of ordinary skill in the art will appreciate that the force biasing the quill 106 away from the table 116 (as described in FIG. 1) may serve to further engage the cam assembly 118 with the quill 106. Thus, the cam assembly 118 may engage the quill 106 until the biasing force of the quill 106 and the frictional interface force between the cam assembly 118 and the quill 106 are overcome, such as with the pinion shaft handle 114 (as described in FIG. 1).

The quill lock assembly 100 may be conveniently used for fixing the position of the quill 106 and the cutting bit 110 (FIG. 1). For instance, a user grasping and pulling a pinion shaft handle 114 for rotating the pinion shaft 112 and translating the cutting bit 110 toward a work piece supported on the table 116 (as described in FIG. 1) may push the handle 124 to engage the cam assembly 118 with the quill 106. After engaging the cam assembly 118 with the quill 106, the user may release the pinion shaft handle 114 and grasp another pinion shaft handle 114. Because of the self-releasing nature of the quill lock assembly 100, as described above, exerting sufficient force on another pinion shaft handle 114 to overcome the biasing force of the quill 106 and the frictional interface force between the cam assembly 118 and the quill 106 will disengage the cam assembly 118 from the quill 106, creating a smooth transition from the operation of one pinion shaft handle 114 to another, such as for one-handed operation of the pinion shaft 112 or the like.

Preferably, the handle 124 is connected to the cam assembly 118 through the shaft 120 so that gravity, which will bias the handle 124 into a downward position, will bias the cam assembly 118 toward a disengaged position relative to the quill 106, as seen in FIG. 3A. It is contemplated, however, that the handle 124 may be placed in a position for biasing the cam assembly 118 toward an engaged position relative to the quill 106. For example, the handle 124 may be placed above the cam assembly 118 for biasing the cam assembly 118 into an engaged position with the quill 106 through the force of gravity on the handle 124. In such a position, the biasing force of the quill 106 is countered by the action of the cam assembly 118 until the cam assembly 118 is disengaged from the quill 106 with the lever 124 or the pinion shaft handle 114, as described above. It is contemplated that a number of tapped holes or the like may be provided in a variety of radial locations in the shaft 120, in combination with one or several handles 124. In this manner, a single handle 124 may be moved from one tapped hole in the shaft 120 to another. Alternately, a number of handles 124 may be used to alternately engage and release the cam assembly 118 from the quill 106.

Figure 4:
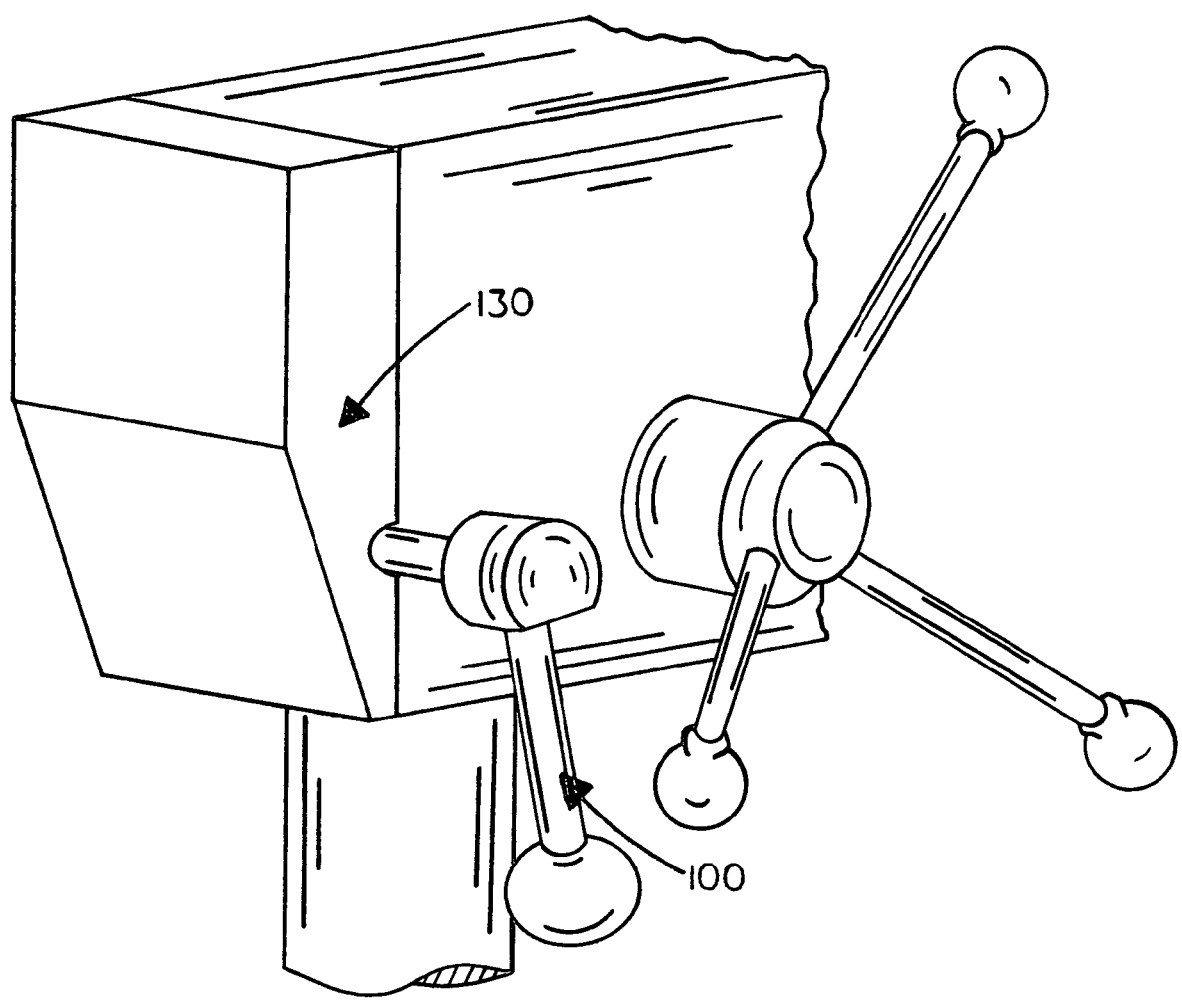
FIG. 4 is an isometric view of the quill lock assembly illustrated in FIG. 1.

Referring now to FIG. 4, a quill lock assembly 100 in accordance with exemplary embodiments of the present invention includes a cover assembly 130. Preferably, the cover assembly 130 encloses components of the quill lock assembly 100, such as the cam assembly 118 (FIG. 2), the shaft 120 (FIG. 2), the mounting bracket 122 (FIG. 2), and the like. In exemplary embodiments of the present invention, the cover assembly 130 is removably attached to the drill press 102. For example, the cover assembly 130 may be fastened to the drill press 102 with screws or the like. Alternately, the cover assembly 130 may be attached to the drill press 102 with a hinge or the like for allowing the cover assembly 130 to be easily disengaged from the drill press 102, allowing easy access to the components of the quill lock assembly 100 or the like. Those of ordinary skill in the art will appreciate that the cover assembly 130 may be formed and attached to the drill press 102 in a variety of ways, enclosing the components of the quill lock assembly 100 in whole or in part, without departing from the scope and intent of the present invention.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A quill lock assembly for locking a quill of a device, comprising:

a cam assembly for being rotationally disposed of the device and a handle connected to the cam assembly for rotating the cam assembly, wherein the handle is rotatable for at least one of engaging and disengaging the cam assembly with the quill.

2. The quill lock assembly of claim 1, wherein the cam assembly is rotationally connected to a mounting bracket for being rotationally disposed of the device, the mounting bracket for being connected to the device.

3. The quill lock assembly of claim 2, wherein the cam assembly is rotationally connected to the mounting bracket via a shaft, the cam assembly being fixedly connected to the shaft.

4. The quill lock assembly of claim 3, wherein the handle is connected to the cam assembly via the shaft.

5. The quill lock assembly of claim 1, wherein the cam assembly comprises a first material for engaging the quill.

6. The quill lock assembly of claim 5, wherein the first material is a wheel having a varying diameter.

7. The quill lock assembly of claim 1, wherein the cam assembly comprises a first material and a second material, the second material being affixed to the first material for engaging the quill.

8. The quill lock assembly of claim 7, wherein the second material comprises an elastomeric material.

9. The quill lock assembly of claim 8, wherein the elastomeric material comprises synthetic rubber.

10. The quill lock assembly of claim 1, wherein a gravitational force on the handle will bias the cam assembly away from the quill.

11. The quill lock assembly of claim 1, wherein the quill lock assembly further comprises a cover assembly for enclosing the quill lock assembly.

12. A drill press assembly including a quill lock assembly for locking a quill of the drill press assembly, comprising:
   a cam assembly for being rotationally disposed of the drill press assembly and
   a handle connected to the cam assembly for rotating the cam assembly,
   wherein the handle is rotatable for at least one of engaging and disengaging the cam assembly with the quill.

13. The quill lock assembly of claim 12, wherein the cam assembly is rotationally connected to a mounting bracket for being rotationally disposed of the device, the mounting bracket for being connected to the device.

14. The quill lock assembly of claim 13, wherein the cam assembly is rotationally connected to the mounting bracket via a shaft, the cam assembly being fixedly connected to the shaft.

15. The quill lock assembly of claim 14, wherein the handle is connected to the cam assembly via the shaft.

16. The quill lock assembly of claim 12, wherein the cam assembly comprises a first material for engaging the quill.

17. The quill lock assembly of claim 16, wherein the first material is a wheel having a varying diameter.

18. The quill lock assembly of claim 12, wherein the cam assembly comprises a first material and a second material, the second material being affixed to the first material for engaging the quill.

19. The quill lock assembly of claim 18, wherein the second material comprises an elastomeric material.

20. The quill lock assembly of claim 19, wherein the elastomeric material comprises synthetic rubber.

21. The quill lock assembly of claim 12, wherein a gravitational force on the handle will bias the cam assembly away from the quill.

22. The quill lock assembly of claim 12, wherein the quill lock assembly further comprises a cover assembly for enclosing the quill lock assembly.

23. A quill lock assembly for locking a quill of a device, comprising:
   rotating a cam assembly via a handle connected to the cam assembly,
   wherein the cam assembly is for being rotationally disposed of the device for at least one of engaging and disengaging the cam assembly with the quill.

24. The quill lock assembly of claim 23, wherein the cam assembly is rotationally connected to a mounting bracket for being rotationally disposed of the device, the mounting bracket for being connected to the device.

25. The quill lock assembly of claim 24, wherein the cam assembly is rotationally connected to the mounting bracket via a shaft, the cam assembly being fixedly connected to the shaft.

26. The quill lock assembly of claim 25, wherein the handle is connected to the cam assembly via the shaft.

27. The quill lock assembly of claim 23, wherein the cam assembly comprises a first material for engaging the quill.

28. The quill lock assembly of claim 27, wherein the first material is a wheel having a varying diameter.

29. The quill lock assembly of claim 23, wherein the cam assembly comprises a first material and a second material, the second material being affixed to the first material for engaging the quill.

30. The quill lock assembly of claim 29, wherein the second material comprises an elastomeric material.

31. The quill lock assembly of claim 30, wherein the elastomeric material comprises synthetic rubber.

32. The quill lock assembly of claim 23, wherein a gravitational force on the handle will bias the cam assembly away from the quill.

33. The quill lock assembly of claim 23, wherein the quill lock assembly further comprises a cover assembly for enclosing the quill lock assembly.

* * * * *